Figure 1:
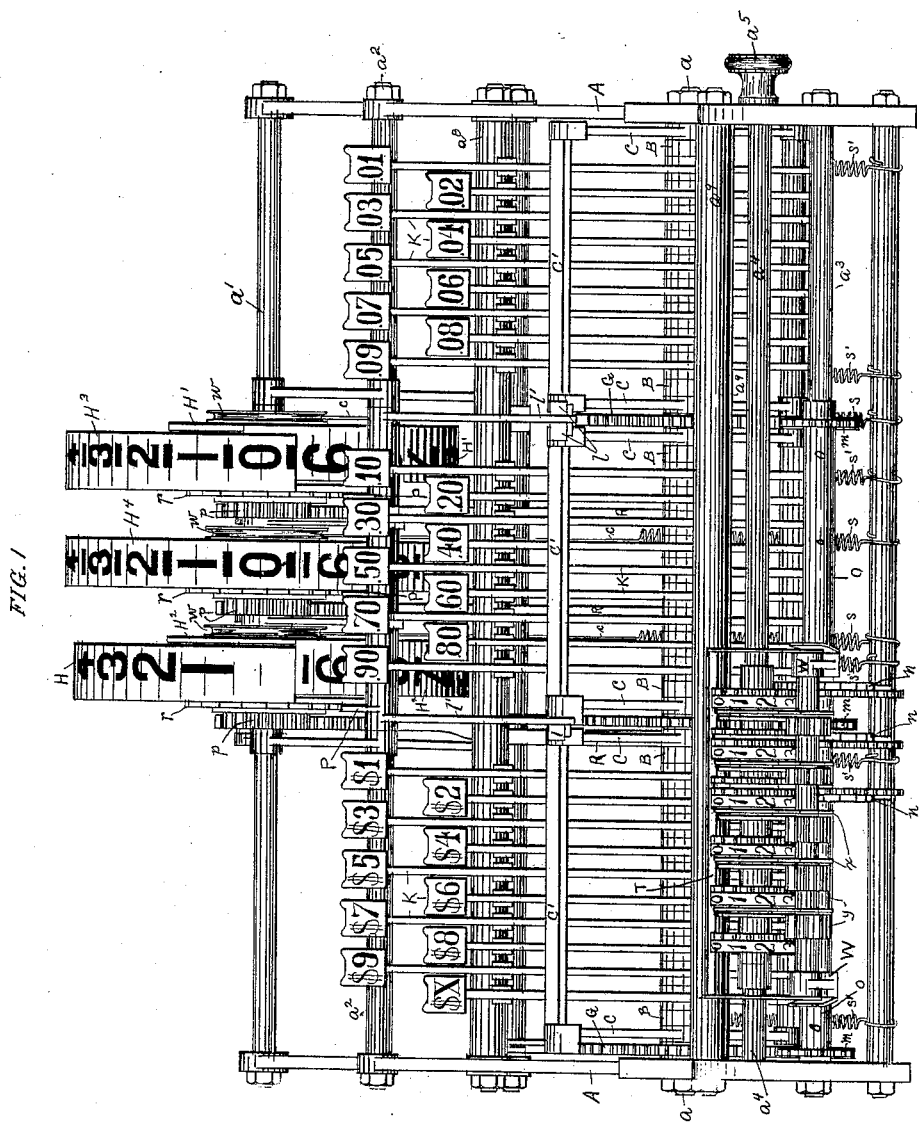

(No Model.) 6 Sheets—Sheet 1.
C. CARR.
CASH INDICATOR AND REGISTER.

No. 468,329. Patented Feb. 9, 1892.

WITNESSES:
Howard L. Coburn
Waldo A. Martin

INVENTOR.
Charles Carr (No Model.) 6 Sheets—Sheet 2.
C. CARR.
CASH INDICATOR AND REGISTER.
No. 468,329. Patented Feb. 9, 1892.
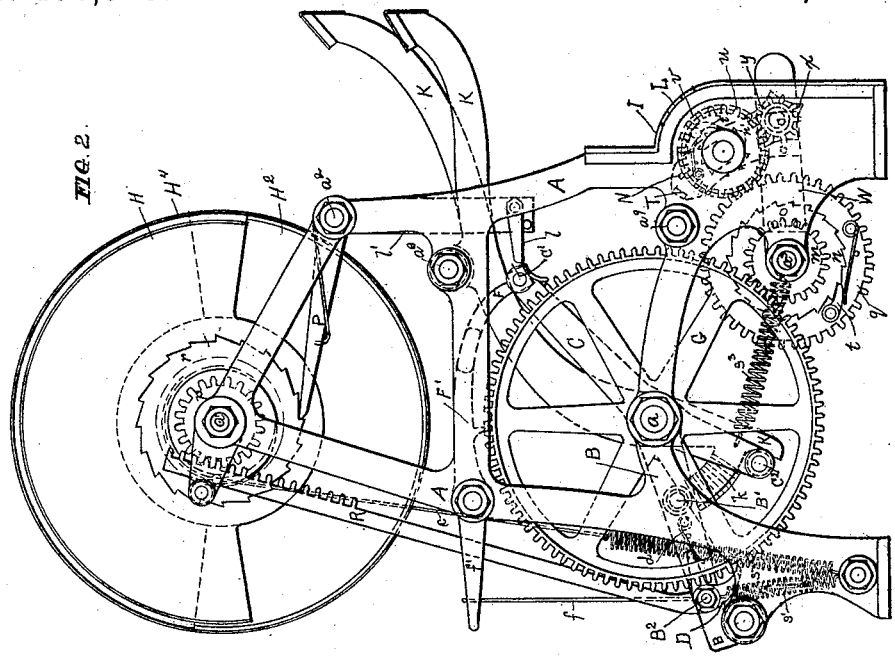
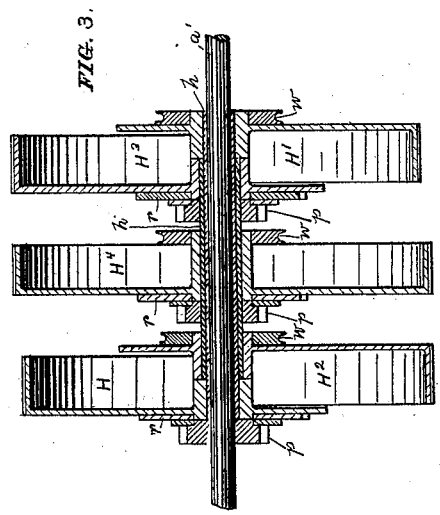
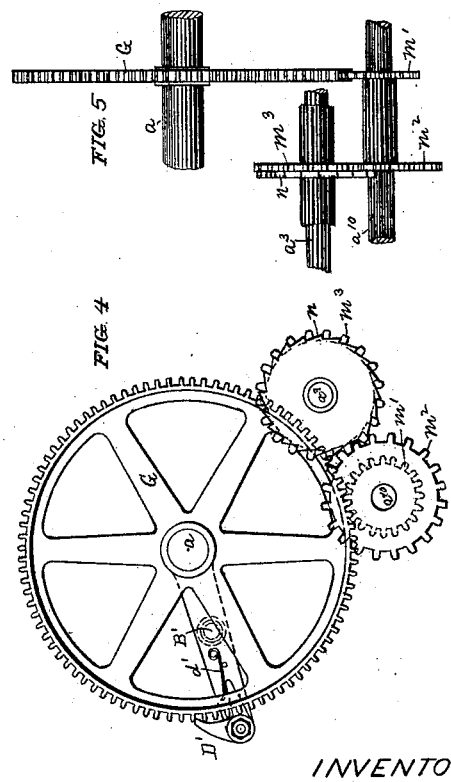
WITNESSES:
Howard L. Coburn
Waldo A. Martin
INVENTOR
Charles Carr

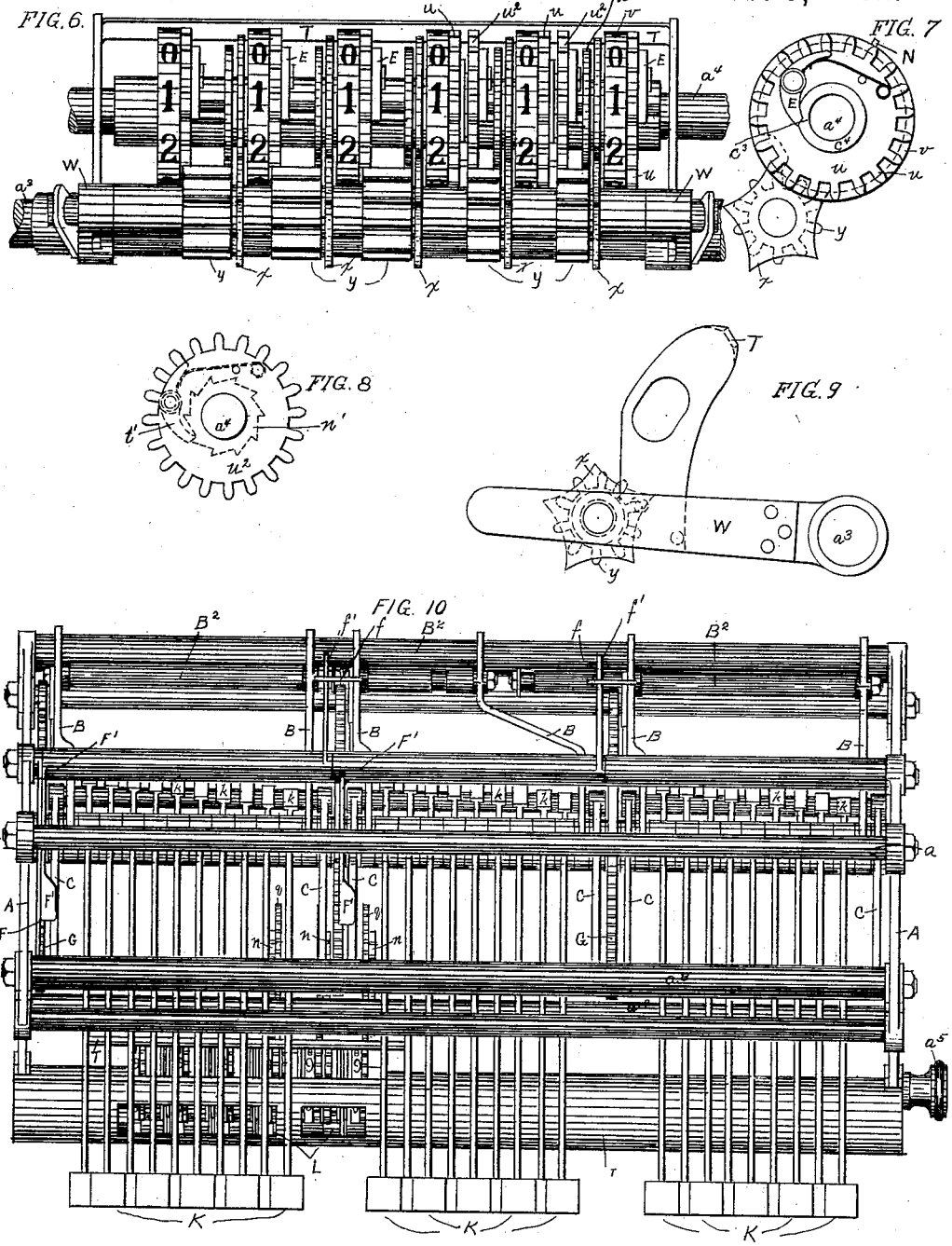

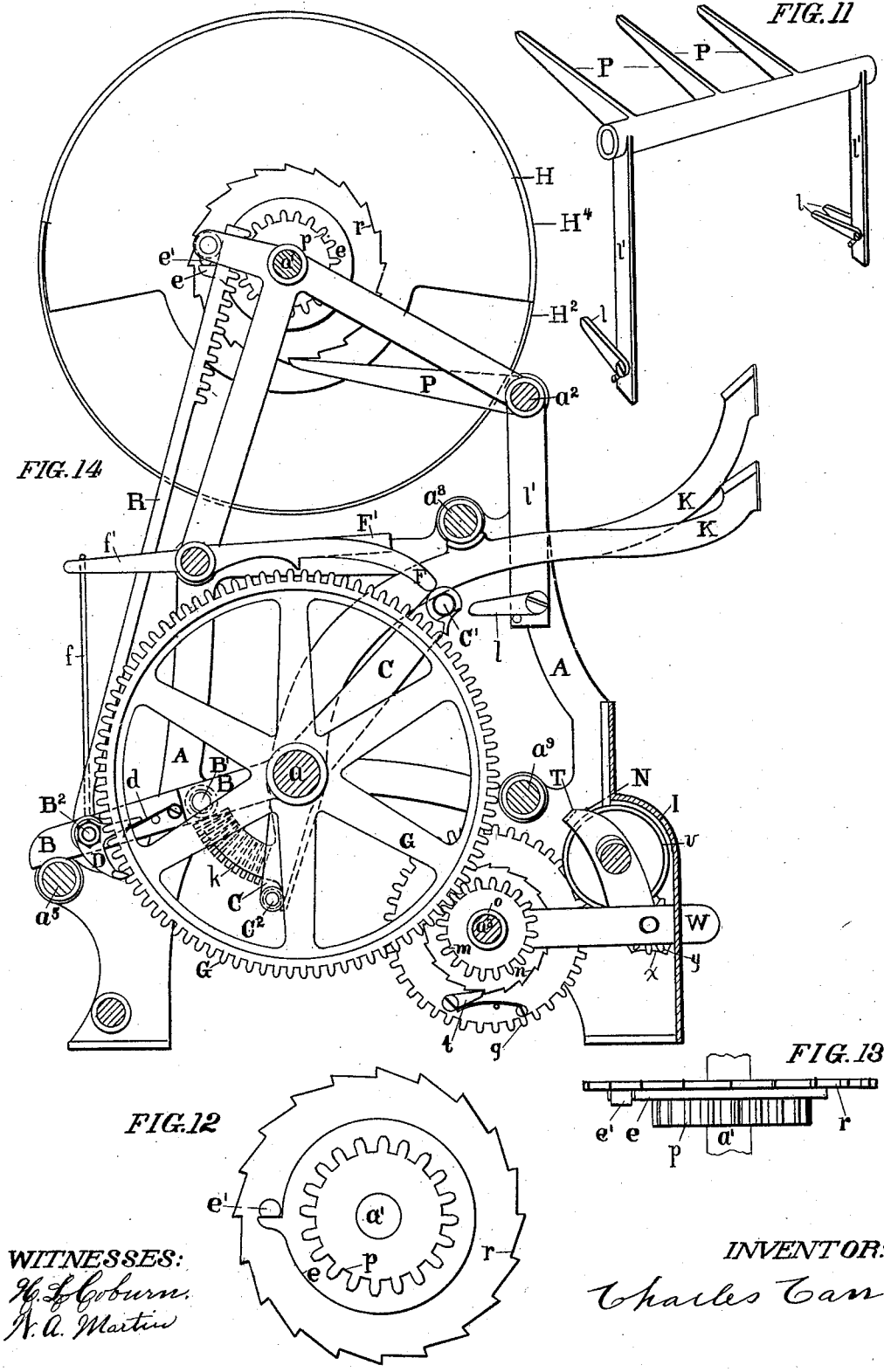

(No Model.) 6 Sheets—Sheet 5.
C. CARR.
CASH INDICATOR AND REGISTER.
No. 468,329. Patented Feb. 9, 1892.
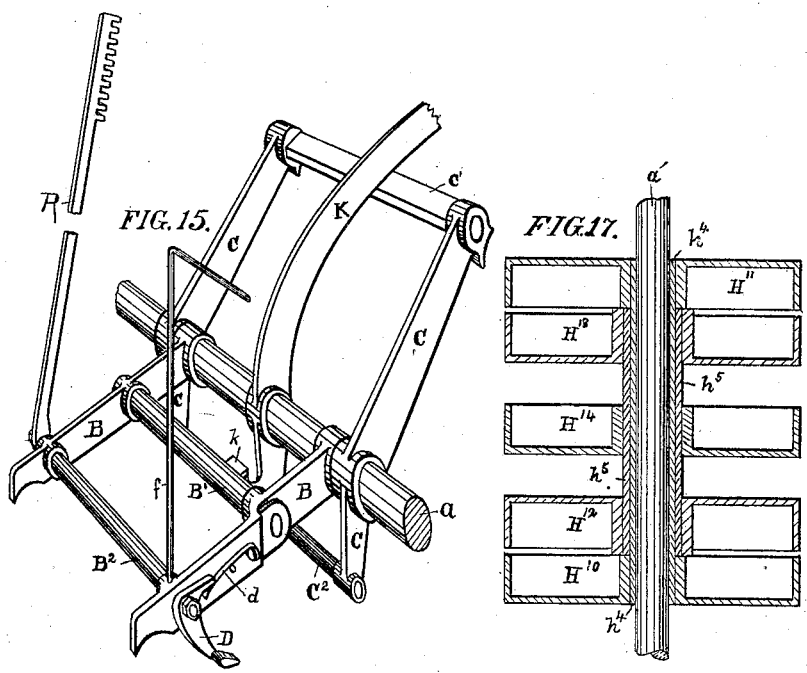
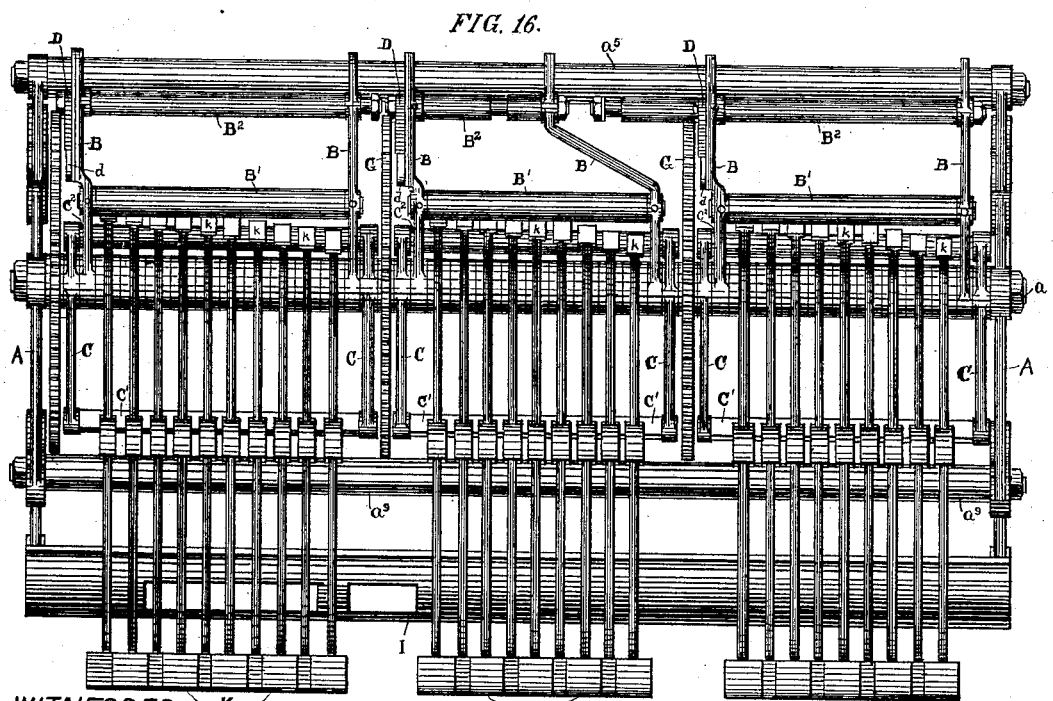

(No Model.) 6 Sheets—Sheet 6.
C. CARR.
CASH INDICATOR AND REGISTER.
No. 468,329. Patented Feb. 9, 1892.
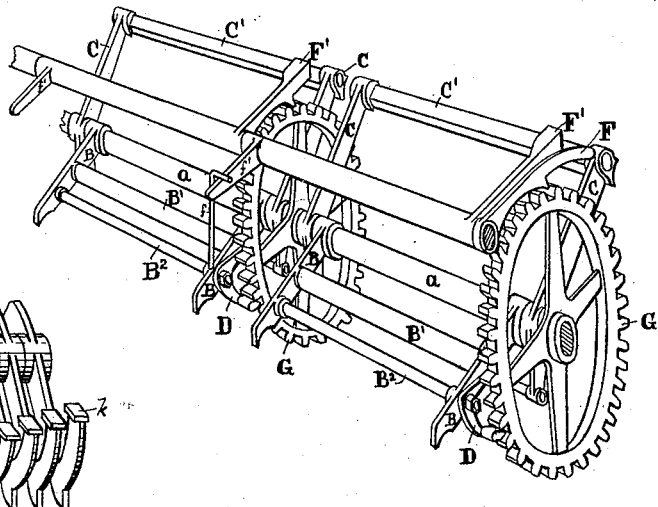
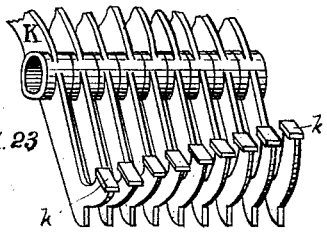
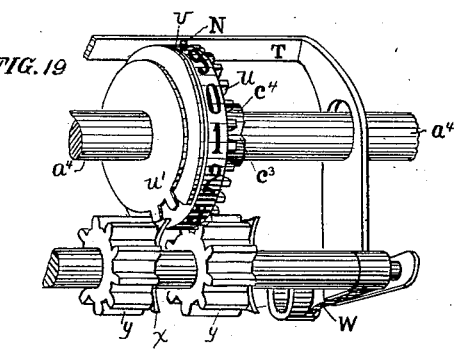
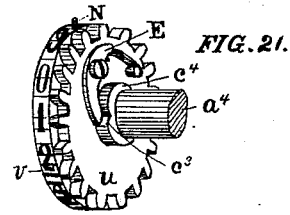
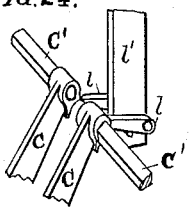
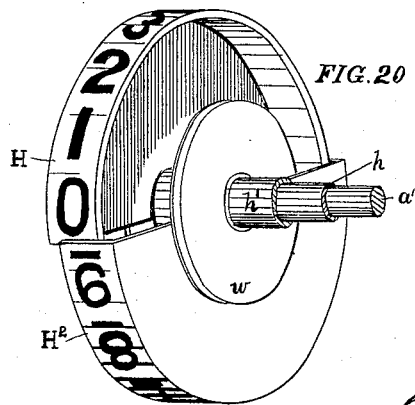
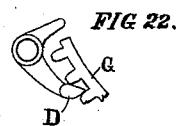
WITNESSES:
INVENTOR,
Charles Carr

UNITED STATES PATENT OFFICE.

CHARLES CARR, OF BOSTON, MASSACHUSETTS.

CASH INDICATOR AND REGISTER.

SPECIFICATION forming part of Letters Patent No. 468,329, dated February 9, 1892.

Application filed November 26, 1890. Serial No. 372,737. (No model.)

*To all whom it may concern:*

Be it known that I, CHARLES CARR, of the city of Boston, county of Suffolk, and State of Massachusetts, have invented certain new and useful Improvements in Cash Registering and Indicating Machines.

The following, together with the accompanying drawings, having reference-letters, herein referred to, is a full and exact description of said invention.

The nature of this invention relates to the indicating and registering devices in a cash registering and indicating machine; and it consists in general of the decimal registering-wheels, the indicating-wheels, and their co-operative and connecting parts and their combinations, substantially as hereinafter more fully set forth.

With reference to the drawings, Figure 1 is a front elevation of a registering apparatus embodying my invention, with the case removed. Fig. 2 is an end elevation of the same. Fig. 3 is a sectional front elevation of the indicating-wheels and their connecting parts. Fig. 4 is a side elevation illustrating a modification of the driving-gearing. Fig. 5 is a front elevation of the same. Fig. 6 is an enlarged front elevation of the adding mechanism. Fig. 7 is an end elevation of parts of the adding mechanism. Fig. 8 is also an end elevation of parts of the adding mechanism. Fig. 9 is an end elevation of the frame which holds the "Geneva stops" and transmitting-pinions. Fig. 10 is a plan showing the registering apparatus, with the indicating apparatus removed. Fig. 11 is a perspective view of the triple pawl for controlling the indicating-wheels. Fig. 12 is an end elevation of a portion of the device for driving or rotating the indicating-wheels. Fig. 13 is a plan view of the same. Fig. 14 is an enlarged sectional elevation. The section is taken just within and parallel to the left-hand end frame A. Fig. 15 is a view in perspective of a key-lever and the parts immediately related thereto. Fig. 16 is a plan of parts showing relations of keys, driving-gears, and connecting parts. Fig. 17 is a sectional elevation illustrating a possible modified arrangement of the indicating-wheels. Fig. 18 is a perspective view of the parts, as indicated by letters, for the purpose of further illustrating their relations and connections, particularly pawls F F'. Fig. 19 is also a perspective view of part of the registering mechanism, for a like purpose. Fig. 20 is a perspective view for further illustrating the construction and relations of parts H $H^2$ and related parts otherwise shown in Fig. 3, &c. Fig. 21 is also a perspective view, further illustrating the construction and relations of parts $v$, $u$, E, $c^3$, $a^4$, and N, and particularly $c^4$. Fig. 22 is a side elevation, and illustrates the construction of pawl D and its holding and yielding relations to wheel G. Fig. 23 is a perspective view, and is to illustrate the gradation in respect to differing lengths of the tappets $k$. Fig. 24 is a perspective view, and will serve to illustrate the relations of triggers $l$ and the arrangement of two of them on one arm $l'$ for the purpose of operating in connection with two adjacent yokes C C' $C^2$.

The frame of the machine, containing and supporting the operating parts, consists in general of two end plates or castings A. (See Figs. 1, 2, 10, 14, and 16.) These are connected by rods $a$ and $a'$ and other longitudinal parts, and may rest upon any suitable base or bed. An ornamental case of wood or metal may inclose the operating mechanism, with properly-located "sight-slots" to allow observation of the numbers on the indicating-wheels.

It is usual in machines of this class to provide a series of keys or levers, marked to indicate the most commonly occurring sums for which purchases are made, the depression of each lever, bringing into view a tablet marked with figures corresponding to the key or lever, and at the same time otherwise registering the amount of the purchase. In my device, as will be readily seen, the keys are arranged and graded in several groups, these groups corresponding in number to the number of digits in the greatest sums to be registered. I have shown three of such groups. This number may be increased, if desired. Each of these key-levers K, as will be seen by reference to Figs. 2, 10, 14, and 16, is provided with a finger-tap on its front end, and is pivoted at $a$, and has on its rear end the lifting-tappet $k$. The tappet on each lever varies in length from its neighbor according to the value represented by such lever. (Observe these variations in Figs. 2, 10, 14, 16, and 23.) Each group of key-levers K is inclosed by a yoke C C' C², pivoted at $a$. A pivoted frame B B' B² also incloses or spans each group of key-levers K.

The frame consists of arms B, pivoted at $a$, lifting-rod B², and a second rod B', against which the rear key-lever tappets operate. Hinged at rod B² upon this frame is a rack R, running upward to mesh with gear $p$, and a pawl D, meshing into wheel G. Also attached at B² is a hook-rod $f$, hooking upon the back end $f'$ of pawl F'. (See Figs. 2, 14, 15, and 18.)

Wheels are employed for indicating as well as for registering. (See Figs. 3 and 17.) In Figs. 1, 3, and 20 they are reduced to one wheel's width for each front and rear reading by using a part-peripheried wheel playing in a similar one, these two parts being fast on different sleeves or shafts carrying similar ones in other positions, so as to secure a correct left to right reading at either the front or the rear of the machine. In Fig. 17 a similar result—i. e., left to right reading—is secured with entire wheels, numbered on part peripheries, but they cannot be as in the other case condensed into the breadth of one wheel for the two reversely-numbered part peripheries. In the first instance, Figs. 1 and 3, H H' are for the "dollar" group of keys, H² and H³ for the "cent" or right-hand group, and the entire middle wheel H⁴ has one-half periphery numbered for each front and rear reading and is operated by the middle or "dime" group of keys.

It is obvious that the number of wheels may be varied to correspond to the number of groups of key-levers or the number of digits in the largest amounts to be indicated. If the number of groups is an "even" one, it will be readily seen that the middle wheel may be dispensed with and two sleeve-coupled wheels be used for each group of key-levers. These wheels all have a common axis in shaft $a'$.

Wheel H on the left and H' on the right (see Figs. 1 and 3) are fast on a common sleeve $h$, turning on shaft $a'$, and are set to face oppositely—viz., front and rear. Wheels H² on the left and H³ on the right are similarly fast on a common sleeve $h'$, which is free to turn on sleeve $h$. It will be readily seen that the wheels H and H' might be made fast to the shaft $a'$, in which case the shaft would have to turn in the bearings, and wheels H² and H³ with sleeve $h'$ would turn on shaft $a'$ instead of sleeve $h$. As may be observed, wheels H and H' are fitted to turn within wheels H² and H³, so that two wheels occupy only about the breadth of one wheel. Wheel H⁴ is an entire wheel and has one-half of its periphery numbered to read from the front and one-half from the rear, and is located between H H² on the left and H' H³ on the right.

The modification shown in Fig. 17 represents wheels H¹⁰ and H¹¹, numbered on opposite parts, as whole wheels fast to a common sleeve $h^4$, which is free to turn upon shaft $a'$, (as before these wheels might be made fast to shaft $a'$, in which case the shaft must turn in its bearings,) and wheels H¹² and H¹³ similarly numbered, also as whole wheels and fast to a common sleeve $h^5$, which is free to turn upon sleeve $h^4$, while the middle wheel H¹⁴, numbered like wheel H⁴ in Fig. 3 on opposite halves of its periphery, is free to turn upon sleeve $h^5$.

The two arrangements are essentially the same, as both are composed of sleeve-coupled wheels, and the object sought is reached by either arrangement—i. e., to have the numbers indicated read correctly from left to right, whether viewed from front or rear, and approximately opposite one to the other.

In the arrangement shown in Figs. 1, 2, and 3 the numbers indicated may be practically opposite to one another; but by the arrangement shown in Fig. 17 the wheels must be set aside enough to expose the figures without cutting the peripheries of the wheels, yet the numbers indicated can be made to show approximately opposite to one another and both read correctly from left to right. On wheels H H³ the digits 0 to 9 are arranged for turning the wheels, as shown in Figs. 2 and 14, to the right, and they are thus made to appear successively at the sight-slots in the front of the case. One set of digits on wheel H⁴ appear in like manner in front, and the other set in the rear. Those also on wheels H' and H² appear at the rear sight-slots. On one side of wheels H, H³, and H⁴ are fastened the ratchet-wheels $r$, (see Figs 2, 3, and 14,) and beside ratchets $r$ are pinions $p$, free to turn and carrying each a driver $e$, having a tooth or lug which by contact with pin $e'$ drives ratchets $r$, and through them the indicating-wheels. Attached to wheels H', H², and H⁴ are grooved wheels $w$, in which run cords $c$, which, fastened to them, are operated by springs $s$ to turn the numeral-indicating wheels backward when released, as otherwhere described. Upon the shaft $a^2$ in front of these wheels (see Figs. 2 and 14) is a triple pawl P, which has two downwardly-projected arms $l'$, which carry at their lower ends the triggers $l$, one to act on each of the yokes C C' C². The three fingers of pawl P each engage one of the ratchets $r$ and so control their action and that of their respectively connected indicating numeral wheels, as will further appear.

The indicating operation is as follows: When one of any or each of the series of keys K is pulled forward and downward it carries also the bail or yoke C C' C². The upper end of yoke C strikes the trigger $l$ upon the arm $l'$ of the triple pawl P, causing said pawl P to turn upon the pivotal rod $a^3$, thereby releasing the ratchet-wheels $r$. If any of the said indicating-wheels have been previously turned from their normal or zero positions, they immediately return by force of the springs $s$ acting through the cords $c$ upon the grooved wheels $w$. (Weights may, if preferred, be employed in place of springs $s$.) As the key K moves still farther the tappet $k$ strikes against the cross-bar B' of the swinging frame B and carries said frame with it. At the outer end of each of these frames B is a second cross-bar $B^2$, to which are attached the racks R, as previously stated, which are pushed upward by the motion of the frames B, and which turn the pinions $p$, and with pinions $p$, by means of the attached disk $e$ and pins $e'$, the ratchet-wheels $r$ and their respectively connected indicating-wheels, said disk $e$ having a tooth or lug by which it acts against pin $e'$ for said purpose. Said ratchets and indicating-wheels are retained in the position to which they are turned by the triple pawl P, which has been released by the yoke C in passing trigger $l$, and brought again into retaining contact with ratchets $r$ by means of a spring. (See Fig. 2.)

On the periphery of the indicating-wheels are arranged the digit characters 1, 2, 3, 4, 5, 6, 7, 8, 9, and 0, and, as the tappets $k$ vary each in length from its neighbors in proportion to the numerical value of the key-lever, (see Figs. 2, 10, 14, 16, and 23,) the motion of key K is uniformly limited by rods $a^8$ and $a^9$, attached to the frame. Thus the indicating-wheels will be turned through an arc corresponding in length to the value of the corresponding key, and the proper digits will be brought before and retained at the sight-slots. To return to the motion of the frames B as they move upward propelled by the action of the levers K and tappets $k$, the pawls D, one of which is attached to the rear end of each of the frames B, (see Figs. 14 and 18,) slip over a number of teeth in the driving-gears G, one of which is provided for each series of keys, (see Figs. 1, 2, 10, 14, 16, and 18,) corresponding to the numerical value of the keys, and by the action of the springs $d$ (see Figs. 2, 14, and 15) are held into gear in the said driving-gears G during the return of the frames B to normal position, which return is accomplished by means of springs $s$. (See Fig. 2.) By reason of the pawls D being held into gears G, it is obvious that said gears must turn during the return of the frames B and pawls D to their normal positions, and the angle through which they turn corresponds to the value of the key being used.

In order to more fully explain how the motion of gears G is transmitted to the adding mechanism, I will take for illustration only the first or right-hand gear G, which corresponds to the cent series of keys. (See Figs. 1, 2, 10, 14, and 16.) The pinion $m$ meshes into gear G and is turned by it, the pinion $m$ and a ratchet $n$ being both fast to a common sleeve $o$, (see Figs. 1 and 14,) which is free to turn on shaft $a^3$, (see Figs. 1, 2, and 14,) the ratchet $n$ must turn with pinion $m$. Beside ratchet $n$ is a pinion $q$, which is driven by ratchet $n$ through pawl $t$, and which in turn drives a gear $u$ of the adding mechanism. In the case under consideration this is the right-hand gear $u$ (see Fig. 6) or the one on the cents or unit digit-wheel $v$ of the adding mechanism. As the digit-wheel $v$ approaches a completion of its revolution it is necessary to "carry" the amount to the next higher wheel, which is accomplished by means of the Geneva stop $x$, transmitting-pinion $y$, and segmental gear $u'$, (see Figs. 6 and 19,) a device in common use for the purpose. The motion of the gears G corresponding to the dime and dollar series of keys is transmitted in a similar manner to the gears $u$ of the second and third digit-wheels, respectively. In order that the motion of these latter wheels shall not affect the wheels of the lower digits, I have arranged the gearing as shown in Figs. 6 and 8—that is, I have placed beside the gears $u$ of the second and third digit-wheels a second wheel $u^2$, and between gears $u$ and $u^2$ a pawl $t'$ and ratchet $n'$, fastened, respectively, to said gears. Thus, while gears $q$ of the dime and dollar series may drive the digit-wheels corresponding each to each, the pawls $t'$ shall slide over ratchets $n'$, and consequently not move the lower digit-wheels. It is also necesary in order to insure accuracy in registering that the three gears G, each representing a different series of keys and each driving a different digit-wheel of the adding mechanism must not drive at the same time, for if they do the process of carrying from one digit-wheel to the next might not be correctly effected. To accomplish the correct result, I have arranged that when the keys K of the dollar series start forward or downward, carrying with them the yoke C C' $C^2$, a gravity-pawl F, (see Figs. 2, 10, 14, and 18,) which has been held out of contact with gear G of the dollar series by means of contact with yoke C, shall drop into mesh with gear G and prevent its movement until said pawl F has been again raised by the return of yoke C. In addition, pawls F', having tubular bearings and arms $f'$, (see Figs. 2, 10, 14, and 18,) are arranged above gears G of both the dime and dollar series, so that when the frame B of the series next below is in its normal position, it shall hold pawls F' out of gears G by means of the hooks $f$ and arms $f'$ of the pawl F'. The gear G of the cent series is free to turn. To illustrate the operation of these pawls and gears suppose that one of the keys K in each series has been pulled downward at the same movement. The pawls D have, as has been described, passed a number of teeth corresponding to the value of their respective keys engaged with gears G and the springs $s'$ are exerting a force sufficient to return frames B and pawls D to a normal position. When the keys K are released the springs $s^3$, attached to yoke C, (see Fig. 2,) draw them back to their normal position and at the same time—i. e., during the return stroke—the springs $s'$ draw downward the frame B of the cent series, turning gear G of that series, and the pawl F has been lifted by the bail C. As frame B of the cent series reaches its normal position, the hook $f$, attached to said frame, pulls downward an arm $f'$ of pawl F' of the dime series, releasing gear G of that series, when by force of springs $s'$ the frame B of dime series is drawn downward, turning gear G of that series and releasing gear G of the dollar series in a similar manner, allowing it to be turned by force of pawls D and springs $s'$. If only the dollar and cent series are in use, the pawls F' perform no functions; but the gear G of the cent series is actuated as before, while the gear G of the dollar series is held by gravity-pawl F until the completion of the return stroke of keys K and bail C, when said pawl F is lifted by bail C, allowing gear G to be turned by pawl D and springs $s'$.

In Figs. 4 and 5 I have shown a modification of the gearing, &c., that may be applied to one of the series of keys, preferably the cent series. The frame B' carries at its outer end the pawl D', which acts in a reversed direction to the action of pawl D. By means of the pawl D' the keys of the series drive gear G in the forward stroke, and to reverse the direction of motion I have introduced a shaft $a^{10}$, carrying pinions $m'$ and $m^2$, which are fast one to the other and drive pinion $m^3$. Pinion $m^3$ is attached to ratchet $n$, which drives pinion $q$ and the adding mechanism. By using this modification the first or cent series of keys will drive on the forward stroke, the dime or second series on the return stroke, when the third or dollar series will be released by pawls F and F', as has been already described. In order that the digit-wheels of the adding mechanism may be easily set at the zero position, I have hung the Geneva stop $x$ and transmitting-pinions $y$ in a swing or frame W, pivoted on $a^3$, (see Figs. 2, 6, 7, 9, 14, and 19,) so that the series of Geneva stops and pinions may be swung out of the mesh with the adding mechanism. At the same time a cross-bar T, also attached to the swing W, rests upon the periphery of the digit-wheels. At the side of the gears $u$ a collar $c^4$ is made fast to shaft $a^4$, which can be turned by the thumb-nut $a^5$. An inclined stop $c^3$ in collar $c^4$ presents a surface for a pawl E to act upon, said pawl E being pivoted to gear $u$. By turning shaft $a^4$ to the right (see Figs. 1, 7, 10, and 21) the stop $c^3$, through pawl E, turns the gear $u$ until pins N in the peripheries of the digit-wheels strike the cross-bar T, when the pawls E, having inclined ends for the purpose, as shown in Figs. 7 and 21, slip over the inclined stops $c^3$ and allow the shaft $a^4$ to turn until all the digit-wheels are in a similar position. The figures on the digit-wheels are so arranged that with the said wheels in the above position the figure 0 will appear at the opening L in the plate I. (See Figs. 2, 10, 14, and 16.)

The devices thus described have the advantage over other similar ones in use of being more positive in action, more simple and durable, and of performing more general and extended registration. The parts may be made of the materials ordinarily used in the construction of this and similar classes of machines.

Having described my invention, what I claim is—

1. In an indicating-machine, a middle reciprocating rotary indicating-wheel having upon each opposite half of its periphery a set of digits, one set reading from the front, the other from the rear, in combination with two or more similar wheels on either hand of said middle wheel mounted on a shaft and sleeves, one of the wheels on the left having a part-periphery set of digits which reads in front, is fast to a sleeve common to one of the wheels on the right, which has a part-periphery set of digits reading from the rear, and vice versa, one of the wheels on the right having a part-periphery set of digits reading from the front, is connected by a common sleeve to a wheel on the left having a part-periphery set of digits reading from the rear, the middle wheel being free to turn uncontrolled by the others upon one of said sleeves as a bearing, as are said sleeve and its wheels upon the second sleeve and said second sleeve and its wheels upon its shaft, each set so connected being operated by suitable mechanism, whereby the said digits may be made to express sums reading correctly from left to right whether viewed from front or rear, substantially as described.

2. In an indicating-machine, the middle indicating-wheel having a reciprocating rotary motion and reading each half from an opposite direction, in combination with two other indicating-wheels having a similar motion and mounted to read in radial opposition one to the other upon a common sleeve to which they are fast, said middle wheel being between the other wheels and loosely mounted upon their common sleeve, with suitable operative mechanism for the purpose of expressing numbers containing more than one digit, substantially as described.

3. In an indicating-machine, the middle indicating-wheel having a reciprocating rotary motion and reading each half from an opposite direction, in combination with one or more front and one or more rear reading-wheels upon either hand of said middle wheel and all having a common axis in connecting shaft and sleeves, and operating mechanism for the purpose of expressing numbers containing several digits, substantially as described.

4. In an indicating-machine, the combination of groups of key-levers and indicating-wheels having a reciprocating rotary motion, each group of key-levers and its two corresponding wheels, one of which reads from the front and one from the rear, representing a progressive degree in notation, said wheels being rigidly coupled by means of sleeves and shaft and all having a common axis for the purpose of indicating numbers containing one or more digits, substantially as described.

5. In an indicating-machine, one or more sets of two sleeve-coupled indicating-wheels, one in each set reading from the front and the other from the rear, having a reciprocating rotary motion, in combination with an intermediate wheel having a similar motion and bearing on the opposite halves of its periphery sets of digits, one set reading from the front and the other from the rear, with suitable operative mechanism for the purpose of expressing numbers containing several digits, substantially as described.

6. In an indicating-machine, the combination of two indicating-wheels mounted upon and fast to opposite parts of a common sleeve and in radial opposition to one another and having a reciprocating-rotary motion with two other like indicating-wheels similarly mounted upon a common sleeve, said sleeves having a common shaft and axis, and suitable operative mechanism for the purpose of expressing numbers containing several digits, substantially as described.

7. The combination of the several sets of indicating-wheels rigidly shaft and sleeve coupled, reading from opposite directions, and having a reciprocating-rotary motion with suitable operative mechanism for the purpose of expressing composite numbers—i. e., numbers composed of several digits, substantially as described.

8. In an indicating-machine, the several sets of indicating-wheels rigidly shaft and sleeve coupled, reading from opposite directions, and having a reciprocating rotary motion, in combination with the intermediate free wheel having a similar motion and bearing upon opposite halves of its periphery oppositely-reading digits, and operative mechanism for representing composite numbers, substantially as set forth.

9. In an indicating-machine, two separately-moving indicating-wheels mounted contiguously side by side upon a common shaft, the rim of one overlapping the rim of the other, thus bringing the two wheels into practically the width space of one, each of these rims bearing upon its periphery a set of digits and each reading from a different point of observation, substantially as described.

10. In an indicating-machine, two sets of indicating-wheels, one set composed of a front and a rear reading-wheel mounted on opposite parts of a common sleeve, the other set composed of two similarly-reading wheels mounted on opposite parts of a common shaft, the sleeve of the first set being mounted and turning upon the shaft of the second set, and the adjacent wheel-rims turning one within the other, whereby the four wheels occupy practically but the width-space of two, substantially as described.

11. A set of two-part periphery-numbered numeral-wheels, one wheel playing within the other, in combination with a second similar but reversely-reading set, also playing one within the other, each of the first set being rigidly coupled on a common axis in radial opposition to one of the other set, substantially as described.

12. In a registering-machine, the combination of groups of operating key-levers, each representing different progressive degrees in notation, the yokes C C' C², triggers $l$, the pawl P, arms $l'$, ratchet-wheels $r$, springs $s$, cords $c$, and grooved wheels $w$, substantially as and for the purpose set forth.

13. In an indicating-machine having groups of key-levers, each group representing a different degree in notation, the combination, with each group, of frames B, rack R, pinions $p$, driver $e$, pin $e'$ for turning the indicating-wheels, and the yoke C C' C², trigger $l$, multiple-pawl P, arm $l'$, ratchet $r$, springs $s$, cord $c$, and grooved wheel $w$ for the purposes of retaining, releasing, and returning the indicating-wheels, substantially as described.

14. In an indicating-machine, the combination of the key-levers, frame B, rack R, operated by pivot connection to rear end of frame, the pinion $p$, numeral-wheel, pin $e'$, ratchet-wheel $r$, and driving-disk $e$, substantially as described.

15. The combination of the key-levers constructed with the relatively-graded lever-tappets $k$, acting directly upon rod B', the frames B B', pawls D, gears G, pinions $m$, ratchet $n$, pawl $t$, gears $q$, and the registering device, substantially as described.

16. The combination of the key-levers, by means of frame B, rack R, pinion $p$, ratchet $r$, pin $e'$, and disk $e$, with the indicating-wheels, and, by means of frame B, pawl D, wheel G, pinion $m$, ratchet $n$, pawl $t$, and wheel $q$, with the registering device, substantially as described.

17. The combination of pawl P, arm $l'$, trigger $l$, yoke C, ratchet $r$, and the key-lever for releasing and controlling the movement of the indicating-wheels by means of said ratchet $r$, substantially as and for the purpose set forth.

18. The combination of the frame B, rack R, pinion $p$, ratchet $r$, pawl P, arm $l'$, trigger $l$, and yoke C with the key-lever for operating and controlling the movements of the indicating-wheels, substantially as described.

19. The combination of the retaining-pawls F', gears G, frames B, hooks $f$, pawls D, key-levers K, and the adding mechanism, substantially as and for the purpose set forth.

20. The combination of yoke C and its rod C', interposed between and acting alternately upon trigger $l$ of arm $l'$ of pawl P, and the pawl F, substantially as and for the purpose set forth.

21. The combination of gear $u$ and its slipping-off pawl E and collar $c^4$ with its inclined stop, the shaft $a^4$, the numeral-wheels, pins N, and stop T, substantially as and for the purpose set forth.

22. The combination of wheel $u^2$, ratchet $n'$ pawl $t'$, gear $u$, numeral-wheel $v$, and driving-gear $q$ for the purpose of turning the numeral-wheels independently of the numeral-wheels of lower value, substantially as described 23. The combination of swing W, constructed with arm and stop-bar T and bearing the Geneva stop and carrying device, with the adding mechanism, whereby the transmitting-pinions may be thrown out of mesh with the gears of the adding mechanism to allow re-setting, substantially as described.

24. In a registering-machine having groups of key-levers, each group on the forward movement setting suitable automatic operative mechanism for propelling an appropriate wheel of an adding mechanism, the combination of said key-levers, adding mechanism, and connecting operative mechanism with suitable automatic retaining and releasing mechanism, whereby a single key-lever of each group may be pulled forward at the same time, setting and retaining the operative mechanism, and on the return of said key-levers the operative mechanism corresponding to the several groups of key-levers will be automatically released one by one, allowing but one to transmit its movement to the adding mechanism at a time, substantially as set forth.

25. In an indicating-machine, several sets of indicating-wheels, each set composed of a front and a rear reading-wheel, which are fast to opposite parts of a common sleeve, the several sleeves having a common axis in a shaft and turning one within the other, and the adjacent wheel-rims also turning one within the other, whereby the several wheels are made to occupy practically but the width space of one-half the actual number, substantially as described.

CHARLES CARR.

Witnesses:
HOWARD L. COBURN,
F. M. HOOPER.